United States Patent
Pilkington

(10) Patent No.: US 9,189,465 B2
(45) Date of Patent: Nov. 17, 2015

(54) DOCUMENTATION OF SYSTEM MONITORING AND ANALYSIS PROCEDURES

(71) Applicant: International Business Machines Corporation, Armonk, NY (US)

(72) Inventor: Adam J. Pilkington, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 369 days.

(21) Appl. No.: 13/630,156

(22) Filed: Sep. 28, 2012

(65) Prior Publication Data

US 2014/0095146 A1    Apr. 3, 2014

(51) Int. Cl.
- *G06F 17/24* (2006.01)
- *G06F 17/27* (2006.01)
- *G06F 9/455* (2006.01)

(52) U.S. Cl.
CPC ............ *G06F 17/24* (2013.01); *G06F 9/45512* (2013.01); *G06F 17/277* (2013.01)

(58) Field of Classification Search
CPC ..... G06F 17/27; G06F 17/20; G06F 17/2705; G06F 17/271; G06F 17/2715; G06F 17/272; G06F 17/2725; G06F 17/273; G06F 17/2735; G06F 17/274; G06F 17/2745; G06F 17/275; G06F 17/2755; G06F 17/276; G06F 17/2765; G06F 17/277; G06F 17/2775
USPC .................................................. 704/1, 9, 10
See application file for complete search history.

(56) References Cited

U.S. PATENT DOCUMENTS

| | | | | |
|---|---|---|---|---|
| 4,800,485 | A * | 1/1989 | Ackroff et al. | 1/1 |
| 7,206,747 | B1 * | 4/2007 | Morgan et al. | 704/275 |
| 7,230,582 | B1 * | 6/2007 | Dove et al. | 345/2.1 |
| 7,509,400 | B1 * | 3/2009 | Tanner et al. | 709/220 |
| 7,634,259 | B2 * | 12/2009 | Shienbrood et al. | 455/418 |
| 8,151,189 | B2 * | 4/2012 | Sukendro | 715/704 |
| 2001/0056344 | A1 * | 12/2001 | Ramaswamy et al. | 704/235 |
| 2003/0204637 | A1 * | 10/2003 | Chong | 709/310 |
| 2007/0033172 | A1 * | 2/2007 | Williams et al. | 707/3 |
| 2007/0150288 | A1 * | 6/2007 | Wang et al. | 704/275 |
| 2007/0277115 | A1 * | 11/2007 | Glinsky et al. | 715/771 |
| 2008/0005286 | A1 * | 1/2008 | Short et al. | 709/220 |
| 2008/0177994 | A1 * | 7/2008 | Mayer | 713/2 |
| 2008/0300053 | A1 * | 12/2008 | Muller | 463/31 |
| 2009/0055557 | A1 * | 2/2009 | Namai et al. | 710/14 |
| 2009/0070634 | A1 * | 3/2009 | Stephan | 714/46 |
| 2009/0198802 | A1 * | 8/2009 | Tanner et al. | 709/221 |
| 2009/0254580 | A1 | 10/2009 | Laurion | |
| 2010/0269032 | A1 | 10/2010 | King et al. | |
| 2010/0325612 | A1 | 12/2010 | Hutchison et al. | |
| 2011/0029916 | A1 * | 2/2011 | Unbedacht et al. | 715/781 |
| 2011/0138286 | A1 * | 6/2011 | Kaptelinin et al. | 715/728 |
| 2013/0085761 | A1 * | 4/2013 | Bringert et al. | 704/275 |
| 2013/0111504 | A1 * | 5/2013 | Dillon et al. | 719/328 |
| 2014/0058537 | A1 * | 2/2014 | Jost | 700/16 |

* cited by examiner

*Primary Examiner* — Lamont Spooner

(74) *Attorney, Agent, or Firm* — Maeve McCarthy

(57) ABSTRACT

A method, computer system, and computer program product to document system analysis procedures. The method includes a computer receiving text in a text editor and determining that the received text is a command relevant to a system under analysis. The method further includes the computer receiving a request to execute the command, and then requesting, from the system under analysis, the output data from the executed command. The output data is then inserted into the text editor.

9 Claims, 4 Drawing Sheets

DOCUMENTATION OF SYSTEM MONITORING AND ANALYSIS PROCEDURES

FIELD OF THE INVENTION

The present invention relates generally to the field of data processing system monitoring, and more particularly to documentation of system monitoring and analysis procedures.

BACKGROUND

System monitoring tools aid in identifying, analyzing, and understanding the state of a system, and diagnosing and solving any problems with the system with regard to resources or performance. Many monitoring tools produce data reports and provide recommendations at individual steps in a system analysis process. Documentation of the system analysis often includes both output from any tools used and text document records of any steps a user took in analyzing and diagnosing system problems.

Text editors may be customized to make text documents easier to read and understand, including the use of, for example, syntax highlighting and automatic completion. Syntax highlighting displays text in different colors and fonts according to a pre-determined, user-customized category of terms, which may include keywords, comments, and variables. Automatic completion editing tools allow a user to type a small amount of text, such as the beginning of a word, and a larger amount of text will automatically be inserted. Automatic completion tools also use a pre-determined database of information to complete words and phrases.

SUMMARY

Embodiments of the present invention provide a method, computer system, and computer program product to document system analysis procedures. The method includes a computer receiving text in a text editor. The method includes the computer determining that the received text is a command relevant to a system under analysis. The method further includes the computer receiving a request to execute the command, and then requesting, from the system under analysis, output data from the executed command. The method includes inserting the output data into the text editor.

DETAILED DESCRIPTION

Figure 1:
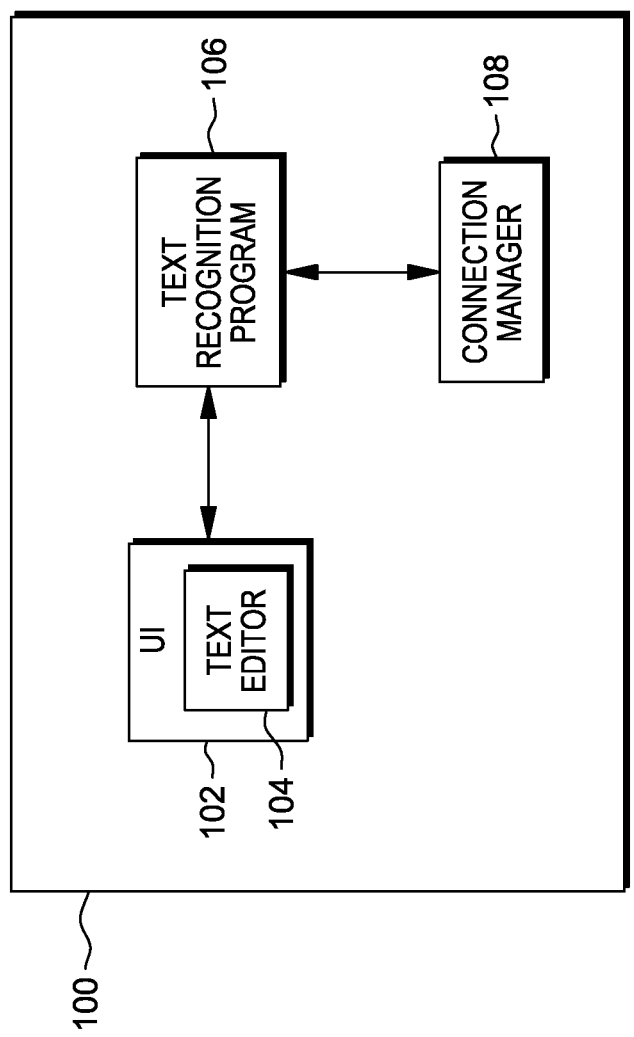
FIG. 1 is a functional block diagram illustrating a data processing system, in accordance with an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Embodiments of the present invention are directed to a data processing system including a text editor in which a user may enter text documenting processes performed and procedures taken during system monitoring and analysis sessions. Text entered into the text editor may be recognized and highlighted as operational commands relevant to the system under analysis. Relevant and available commands vary based on the current state of the system analysis session and on what aspect of the system is being analyzed. The user can also choose to insert data related to the command, such as output from execution of the command, into the text editor document. The data inserted is dynamically generated from the system under analysis based on the current state of the system.

The present invention will now be described in detail with reference to the Figures. FIG. 1 is a functional block diagram illustrating a data processing system, generally designated 100, in accordance with an embodiment of the present invention.

In this exemplary embodiment, data processing system 100 includes user interface (UI) 102 for displaying data, text, user options, and instructions for operation. UI 102 includes text editor 104, which can accept text entered by a user or display text altered either directly by the user or the application. In some examples, the text entered by the user may be letters, numbers, and other printable characters. UI 102 may be, for example, a graphical user interface (GUI) or a web user interface (WUI). Although UI 102 is shown as including text editor 104, one of skill in the art will appreciate that, in other embodiments, the UI may be separate from the text editor.

Data processing system 100 runs text recognition program 106 for identifying and highlighting text in text editor 104 that represents operational commands, determined by the text recognition program to be relevant and available in an analysis session based on the current state of the system under analysis. Text recognition program 106 can also determine whether or not a user has chosen to insert data corresponding to the identified command and reports any request for data insertion to connection manager 108. Connection manager 108 communicates to text recognition program 106 both the current state of the system under analysis, and upon a user request, any dynamically generated data from the analysis session that is chosen for insertion into text editor 104.

Data processing system 100 may be a server computer, a client computer, a notebook computer, a laptop computer, a tablet computer, a handheld computing device or smartphone, a thin client, or any other electronic device or computing system capable of receiving input from a user, performing computational operations, and displaying data. In another embodiment, data processing system 100 represents a computing system utilizing clustered computers and components to act as a single pool of seamless resources when accessed through a network. This is a common implementation for data centers and for cloud computing applications.

Data processing system 100 can include internal and external components, as described in more detail below with reference to FIG. 4.

Figure 2:
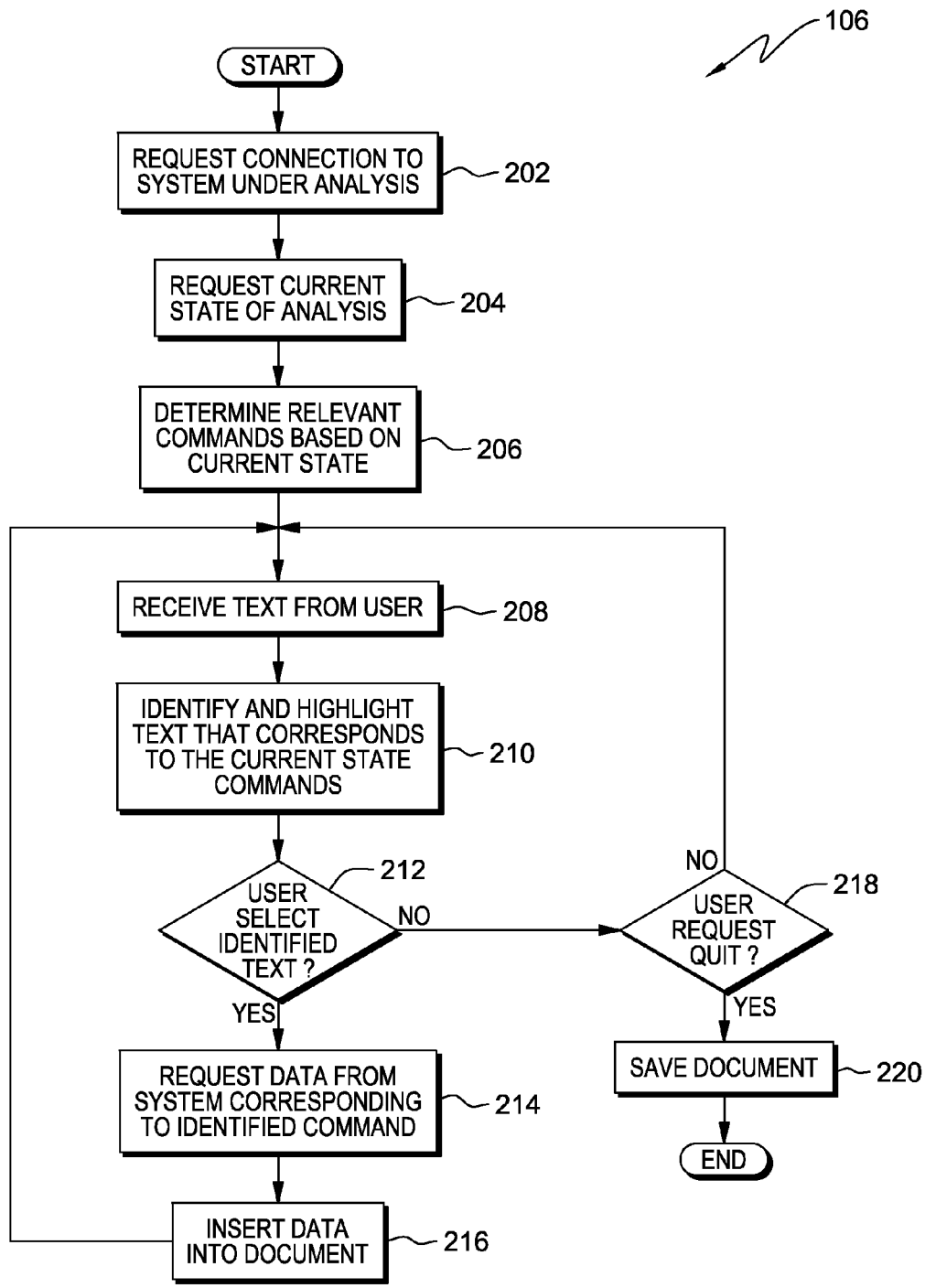
FIG. 2 is a flowchart depicting operational steps of a text recognition program, in accordance with an embodiment of the present invention.

FIG. 2 is a flowchart depicting operational steps of text recognition program 106 for identifying and highlighting commands in text editor 104 and for inserting data into text editor 104, in accordance with an embodiment of the present invention.

Text recognition program 106 requests a connection to the system under analysis (step 202) and the current state of the system analysis (step 204) from connection manager 108. Connection manager 108 communicates the current state of analysis at the time of connection and not the state corresponding to a previous connection between text recognition program 106 and the connection manager.

Text recognition program 106 determines the relevant commands based on the current state of the system under analysis (step 206). Relevant commands are those available to the system under analysis and can vary based on the state and the system under analysis. In an example, connection manager 108 communicates to text recognition program 106 the current state of an operating system (OS) on which a Java process is currently running. Text recognition program 106 determines the relevant commands which work on Java, e.g., a command which will show the currently configured Java heap options.

Text recognition program 106 receives text, which is entered by a user into text editor 104 (step 208). The text may include procedures taken regarding the system analysis and the investigation and processes being performed on the system.

Text recognition program 106 identifies and highlights any of the received text that may correspond to relevant commands determined in step 206 (step 210). Command text is highlighted so that the command text is called to the attention of the user. For example, connection manager 108 may communicate that the current state of analysis is related to problem detection and therefore the analysis may be in initial stages. A user may enter a step by step process undertaken, where a step may include a phrase such as "diagnostics collector" to signify the use of a diagnostic collecting tool. At the current state of the system under analysis, text recognition program 106 can identify and highlight "diagnostics collector" as a relevant command in text editor 104.

Text recognition program 106 determines whether a user has selected the highlighted command text (step 212). The user selection may occur, for example, by a mouse click or by a key press. If the user selects the highlighted text (step 212, yes branch), text recognition program 106 requests data corresponding to the identified command text from connection manager 108 (step 214). Text recognition program 106 inserts the data from the system into the current text editor document (step 216). In the example from above, a user may select the highlighted text "diagnostics collector" through a key press, for example, pressing "ctrl+enter." Connection manager 108 may then communicate diagnostic data from the system, such as a system dump, for the problem event under analysis.

In various embodiments of the present invention, connection manager 108 can transmit data for insertion that includes additional commands. For example, data that results from a diagnostic collection tool, as in the example above, may include a phrase such as "option: run configuration check" and text recognition program 106 may identify and highlight "run configuration check" as a command. A user can then choose to execute the command by selecting the highlighted text. Text recognition program 106 communicates the selection to connection manager 108, which in turn communicates the selection to the system under analysis. Output data from the execution of the command can be returned to text editor 104 and added to the ongoing text document. Text recognition program 106 continues to run after inserting data, as long as the text recognition program is connected to the system under analysis, by returning to step 208 to receive additional user entered text.

If the user does not select the highlighted command text (step 212, no branch), text recognition program 106 determines if the user has requested to quit the program (step 218). A request to quit text recognition program 106 notifies connection manager 108 that the session has been terminated by the user. In an exemplary embodiment, a user may request to quit by closing the text editor. If the user does not request to quit (step 218, no branch), text recognition program 106 remains connected to the system under analysis and returns to receive text from the user (step 208). If the user does request to quit (step 218, yes branch), text recognition program 106 saves the text document (step 220) for the user to resume documentation of the system analysis at a later time. In this exemplary embodiment, in order to resume documentation, text recognition program 106 again requests a connection to the system under analysis (step 202).

Figure 3:
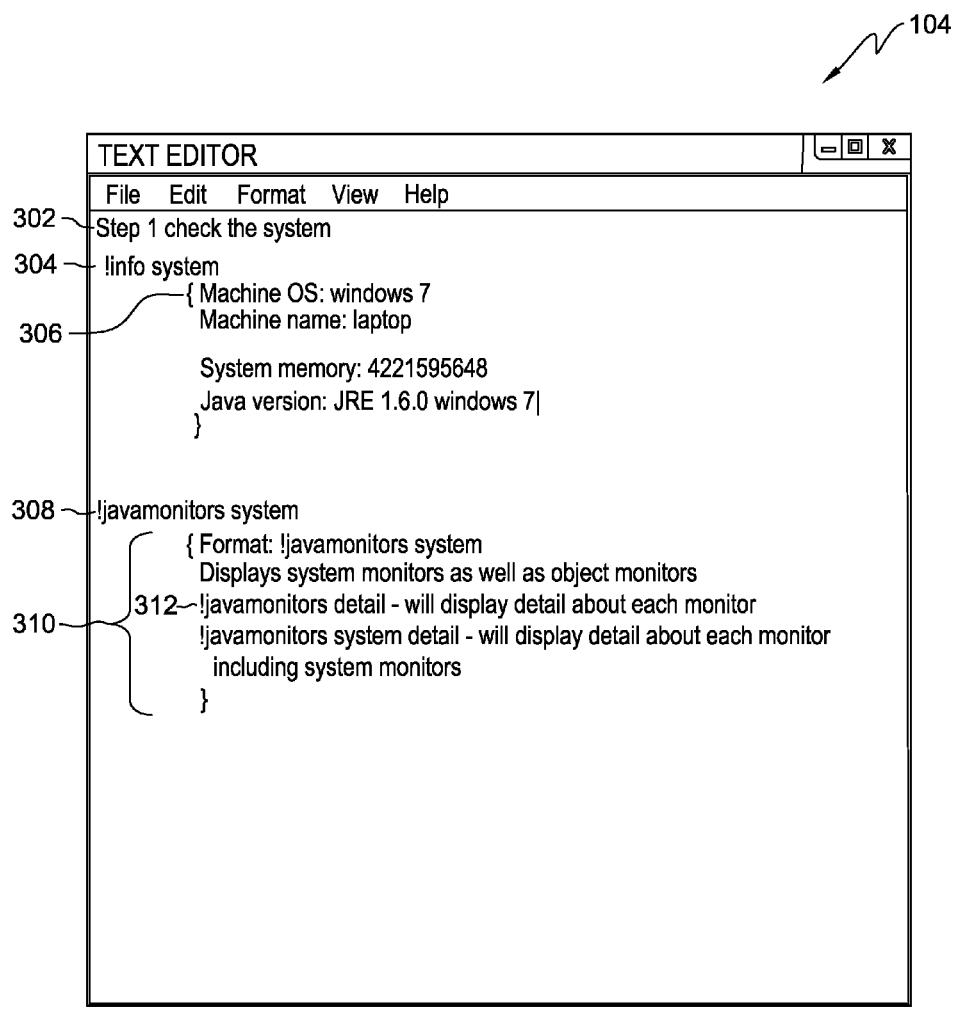
FIG. 3 is an exemplary depiction of a user interface including a text editor as shown in FIG. 1, in accordance with an embodiment of the present invention.

FIG. 3 is an exemplary depiction of UI 102 including text editor 104, in accordance with an embodiment of the present invention. Text recognition program 106 runs on the text a user enters in text editor 104. Text 302 may represent the beginning of the step by step procedure documentation of the user. In an exemplary embodiment, based on the current state of the system under analysis communicated to text recognition program 106 by connection manager 108, text recognition program identifies and highlights text 304 as a command. If the user selects the highlighted command, for example, by pressing a combination of keys, text recognition program 106 requests data for the command from the underlying analysis session, through connection manager 108, and inserts the data, text 306, into text editor 104. Text recognition program 106 continues to run on text entered into text editor 104 while the user continues to document steps taken during the analysis session.

Various embodiments of the present invention may allow connection manager 108 to return data including further commands for insertion in text editor 104. In an exemplary embodiment, text 308 is entered by the user, which text recognition program 106 identifies and highlights as a command, based on the current state of the system analysis. If the user selects to insert output data from execution of the highlighted command text 308, connection manager 108 transmits data including further commands, represented by text 310. Text recognition program 106 identifies and highlights commands in text 310, such as text 312, which a user can choose to execute and insert resulting output data.

Figure 4:
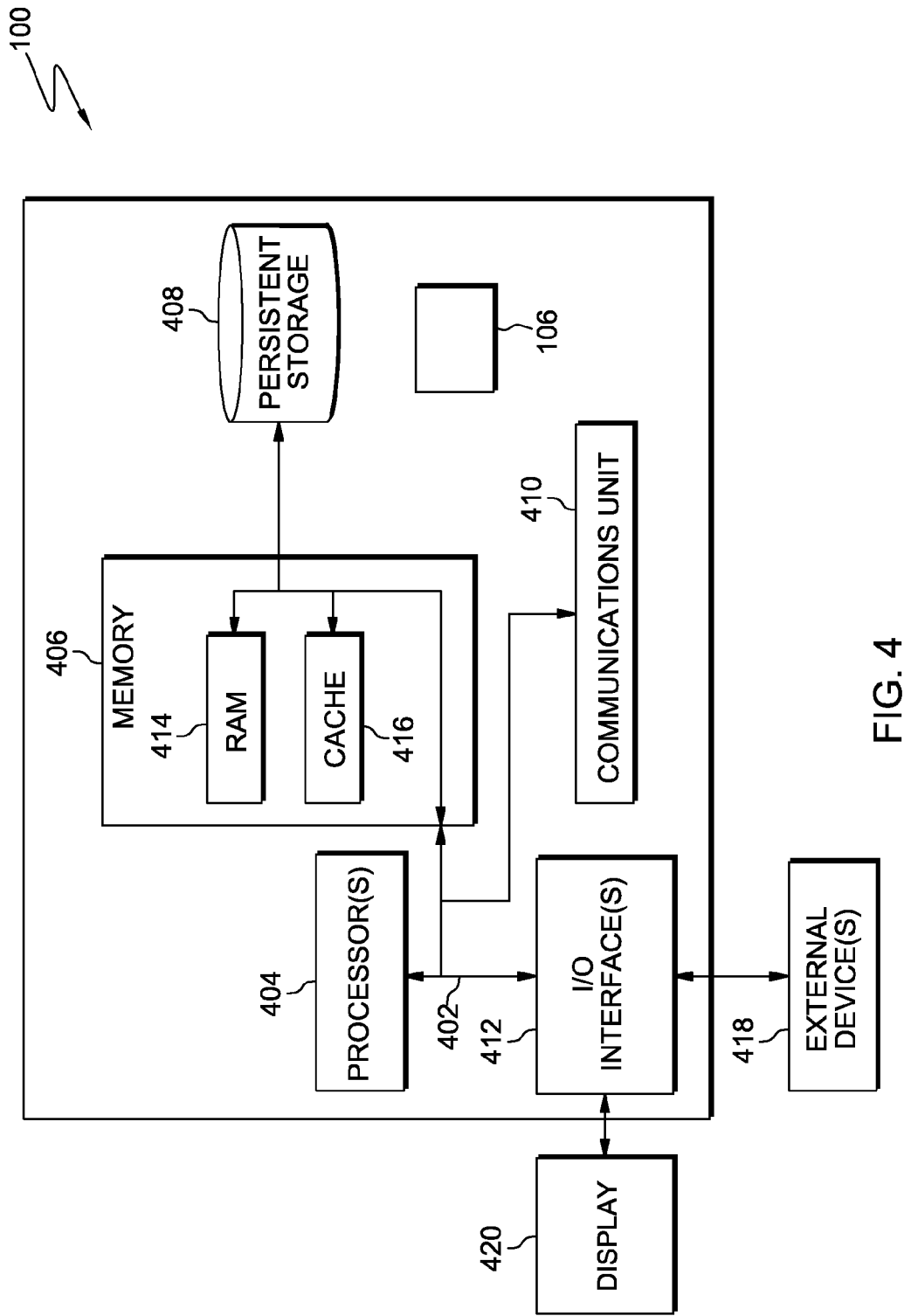
FIG. 4 depicts a block diagram of components of the data processing system of FIG. 1, in accordance with an embodiment of the present invention.

FIG. 4 depicts a block diagram of components of data processing system 100 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Data processing system 100 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Text recognition program 106 is stored in persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Text recognition program 106 may be downloaded to persistent storage 408 through communications unit 410.

I/O interface(s) 412 allows for input and output of data with other devices that may be connected to data processing system 100. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., text recognition program 106, can be stored on such portable computer-readable storage media and can be loaded onto persistent storage 408 via I/O interface(s) 412. I/O interface(s) 412 also connect to a display 420. Display 420 provides a mechanism to display data to a user and may be, for example, a computer monitor or an incorporated display screen, such as is used in tablet computers and smart phones.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowcharts and block diagrams in the Figures illustrate the architecture, functionality, and operations of possible implementations of systems, methods, and computer program products according to various embodiments of the present invention. However, numerous modifications and substitutions can be made without deviating from the scope of the present invention. Such modifications and substitutions that may be apparent to a person skilled in the art of the invention are intended to be included within the scope of the invention as defined by the accompanying claims. In this regard, each block in the flowcharts or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions. The foregoing description is not intended to be exhaustive nor to limit the invention to the precise form disclosed. Therefore, the present invention has been disclosed by way of example and not limitation.

What is claimed is:

1. A method for documenting system analysis procedures, the method comprising the steps of:
   a computer receiving text in a text editor;
   the computer determining the received text is a command relevant to a system under analysis, based, at least in part, on a first state of the system under analysis and the system under analysis;
   the computer identifying the command, wherein identifying the command includes highlighting the text in the text editor;
   the computer receiving a request to execute the command;
   the computer requesting, from the system under analysis, a first output data from the executed command; and
   the computer inserting the first output data from the system under analysis into the text editor.

2. The method of claim 1, wherein the output data is generated based on the first state of the system under analysis.

3. The method of claim 1, further comprising the steps of:
   the computer determining the first output data contains a further command relevant to the system under analysis;
   the computer identifying the further command;
   the computer receiving a request to execute the further command;
   the computer requesting a second output data, from the system under analysis, from the executed further command; and
   the computer inserting the second output data from the executed further command into the text editor.

4. A computer program product for documenting system analysis procedures, the computer program product comprising:
   one or more computer-readable tangible storage devices and program instructions stored on at least one of the one or more computer-readable tangible storage devices, the program instructions comprising:
   program instructions to receive text in a text editor;
   program instructions to determine the received text is a command relevant to a system under analysis, based, at least in part, on a first state of the system under analysis and the system under analysis;
   program instructions to identify the command, wherein identifying the command includes highlighting the text in the text editor;
   program instructions to receive a request to execute the command;
   program instructions to request, from the system under analysis, a first output data from the executed command; and
   program instructions to insert the first output data into the text editor.

5. The computer program product of claim 4, wherein the first output data is generated based on the first state of the system under analysis.

6. The computer program product of claim 4, further comprising:
   program instructions to determine the first output data contains a further command relevant to the system under analysis;
   program instructions to identify the further command;
   program instructions to receive a request to execute the further command;
   program instructions to request a second output data, from the system under analysis, from the executed further command; and
   program instructions to insert the second output data from the executed further command into the text editor.

7. A computer system for documenting system analysis procedures, the computer system comprising:
   one or more processors, one or more computer-readable memories, one or more computer-readable tangible storage devices, and program instructions stored on at least one of the one or more computer-readable tangible storage devices for execution by at least one of the one or more processors via at least one of the one or more memories, the program instructions comprising:
   program instructions to receive text in a text editor;
   program instructions to determine the received text is a command relevant to a system under analysis, based, at least in part, on a first state of the system under analysis and the system under analysis;
   program instructions to identify the command, wherein identifying the command includes highlighting the text in the text editor;
   program instructions to receive a request to execute the command;
   program instructions to request, from the system under analysis, a first output data from the executed command; and
   program instructions to insert the first output data into the text editor.

8. The computer system of claim 7, wherein the first output data is generated based on the first state of the system under analysis.

9. The computer system of claim 7, further comprising:
   program instructions to determine the first output data contains a further command relevant to the system under analysis;
   program instructions to identify the further command;
   program instructions to receive a request to execute the further command;

program instructions to request a second output data, from the system under analysis, from the executed further command; and program instructions to insert the second output data from the executed further command into the text editor.

\* \* \* \* \*